May 16, 1933.  R. I. ADAMS  1,909,647
PLOW
Filed June 13, 1932   3 Sheets-Sheet 3
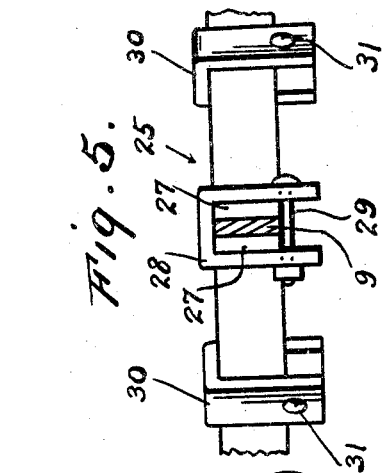
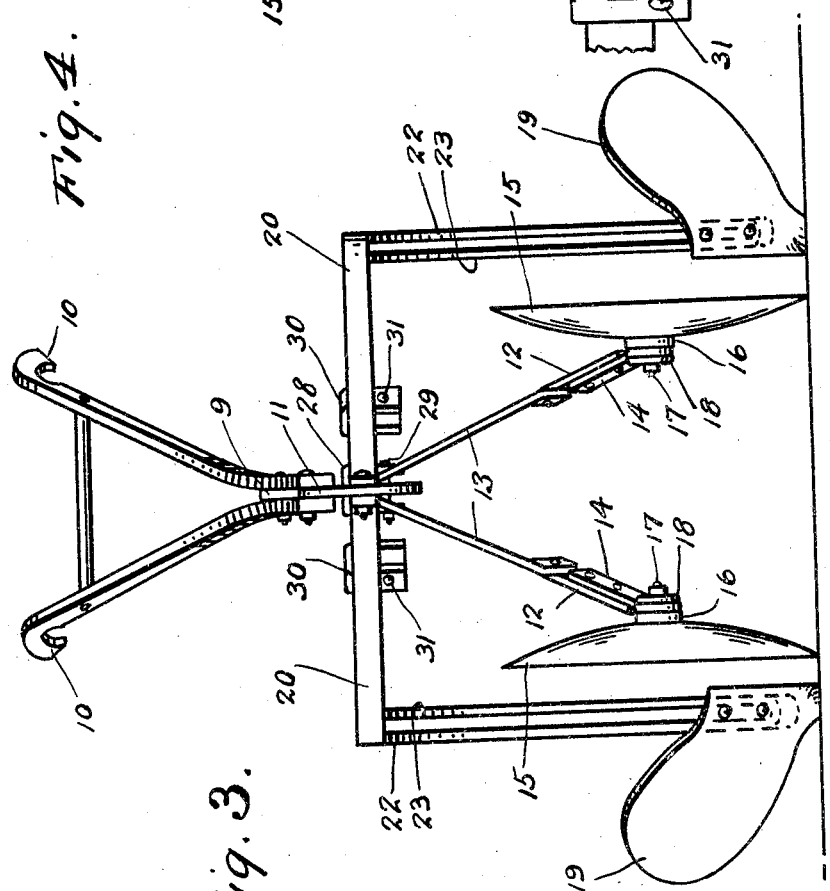
Inventor
Robert I. Adams
By Clarence A. O'Brien
Attorney Patented May 16, 1933

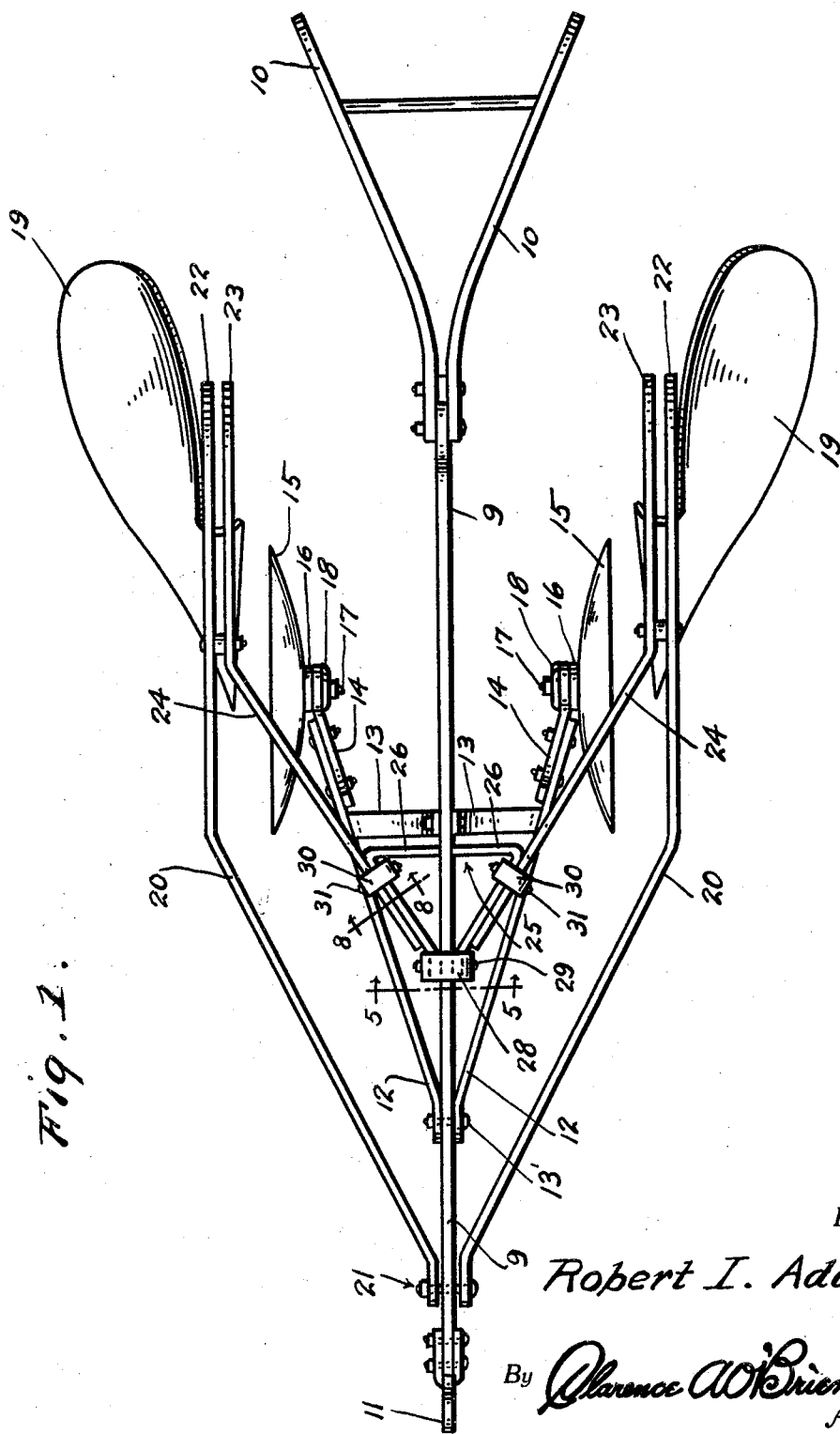

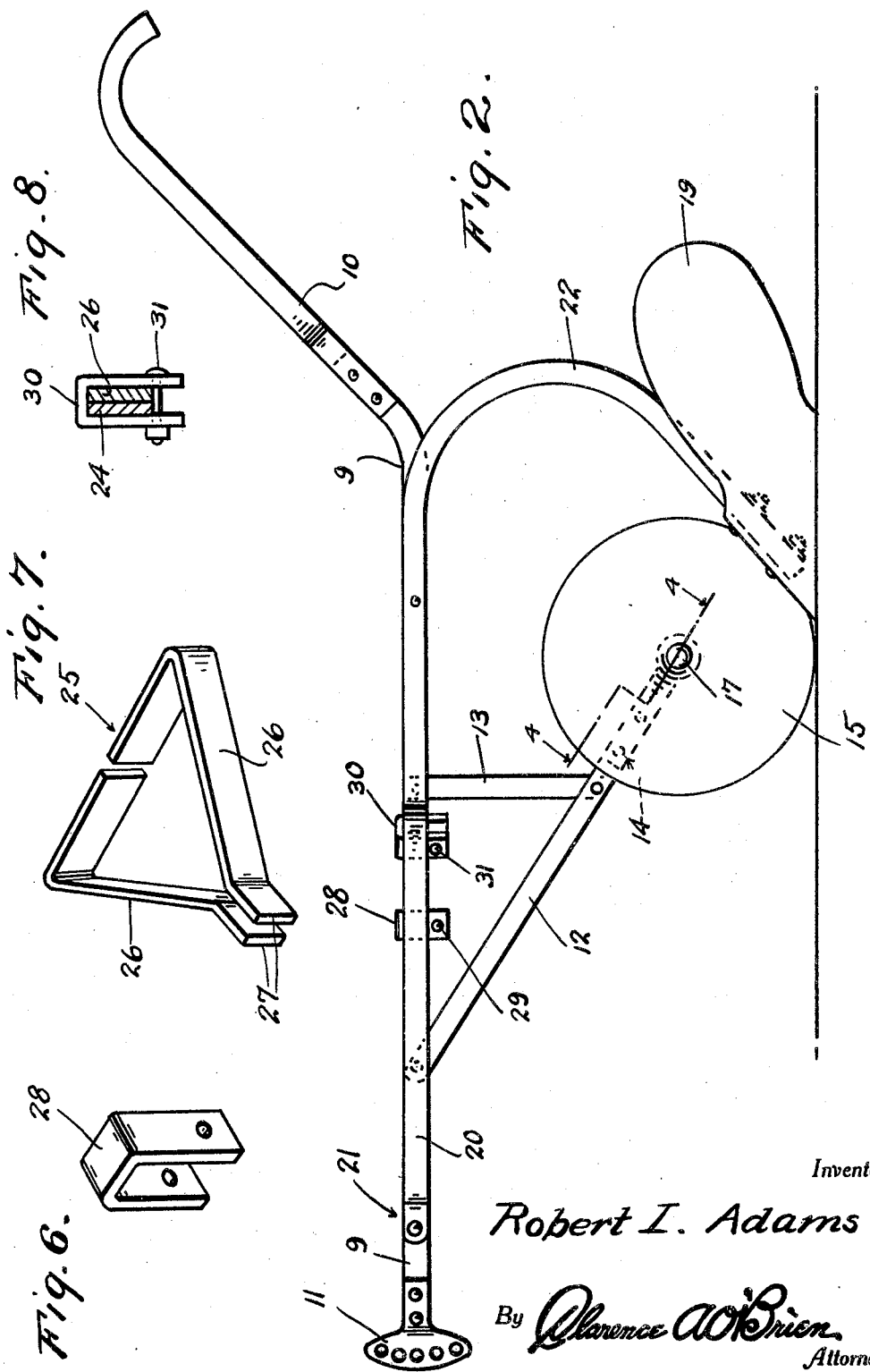

1,909,647

UNITED STATES PATENT OFFICE

ROBERT IRBY ADAMS, OF CHESNEE, SOUTH CAROLINA

PLOW

Application filed June 13, 1932. Serial No. 617,012.

This invention relates to the broad class of plows and has more specific reference to a novel cultivating plow utilizing a plurality of mold board equipped plows and associated discs, the latter being for the purpose of protecting and preventing small plants from being covered by dirt when the device is in use.

Briefly stated, the preferred embodiment of the invention comprises a beam having a fixed depending frame carrying adjustable opposed concavo-convex discs, together with a pair of complemental plows and supporting means therefor, said plows being disposed adjacent to but outwardly of the discs.

The principal feature of the invention is in the provision of a novel duplex disc and plow assembly wherein the plows are laterally adjustable with respect to the line of draft, whereby to permit said plows to be adjusted toward and from the discs.

In carrying the inventive conception into actual practice, I have discovered an unusually novel and practical assemblage of parts calculated to promote the requisite degree of efficiency and to thereby accomplish the desired result in an adequate and satisfactory manner.

In the accompanying illustrative drawings wherein like numerals are employed to designate like parts throughout the same:

Figure 1 is a top plan view of the entire machine with the parts constructed and arranged in accordance with the principles of this invention.

Figure 2 is a side elevational view of Figure 1.

Figure 3 is a rear end elevation observing Figure 2 in a direction from right to left.

Figure 4 is a detailed section taken approximately on the plane of the line 4—4 of Figure 2.

Figure 5 is a transverse horizontal section on the line 5—5 of Figure 1, the view being enlarged.

Figures 6 and 7 are perspective views of certain of the details.

Figure 8 is a detail cross section on the line 8—8 of Figure 1.

Referring first to Figure 1, it will be observed that the numeral 9 designates the central longitudinally disposed beam. At its rear end, it is provided with appropriate handles 10 while at its frontal end it is provided with a draft connection clip 11.

The aforesaid depending frame comprises a pair of companion bars 12 rigidly secured as at 13' to the front end portion of the beam and extending downwardly at the proper angle in diverging relationship, the numerals 13 designating braces attached to said bars 12 as well as to the beam 9. The numerals 14 designate arms adjustably fastened to the lower ends of the bars 12, said arms serving to support the concavo-convex discs 15, which latter are so arranged relative to the plows 19 as to protect small plants, and prevent the same from being covered by the dirt thrown by the plows.

As seen in Figure 4, the arm 14 is apertured to accommodate a bearing 16 in which the axle 17 is mounted for rotation. The numerals 18 merely designate a washer. These two discs are disposed in transversely spaced alinement, that is, opposed to each other with their concaved sides facing outwardly. A special frame structure is utilized to accommodate and support the plows 19. Incidentally the plows may be of any appropriate construction.

The primary members 20 of the plow frame have their forward ends disposed in converging relation and loosely and pivotally connected as at 21 to the front end portion of the beam. The rear ends of these members are curved downwardly as indicated at 22 in Figure 2 to accommodate the plows. The numerals 23 designate a pair of complemental adjusting arms whose forward end portions 24 are disposed in converging relationship at opposite sides of the central portion of the beam 9 as shown in Figure 1.

The parts 20 and 23 are rigidly secured together in the spaced relation shown and are movable as units to permit the plows 19 to be adjusted toward and from the discs 15. This is accomplished through the medium of a substantially triangular expanding wedge which is denoted as a unit by the numeral 25. This wedge is actually made up of a pair of duplicate co-ordinated sections 26 of the shape shown in Figure 7, the terminals 27 of these members riding alongside of the faces of the beam and are attached to the beam by a U-clip 28 provided with an appropriate binding post 29 as shown in Figure 5.

Additional, or supplemental U-shaped clips are represented by the numerals 30 and these are also provided with clamping bolts 31. There are two of these clips 30, that is, one for each of the sections 26 of the sliding wedge 25 and the clips 30 are so arranged as to attach these sections 26 to the adjacent end of the expanding arm 24. It is evident that by bodily adjusting the wedge 25 back and forth on the beam, the frame members 20 are moved in or out through the medium of the cam action between the wedge and the expanding arms 24.

The gist of the invention is in the provision of a beam having appropriate handles at one end and means at the opposite end for convenient attachment of horses or other power, wherein said beam is provided with a substantially V-shaped rigid frame carrying a pair of opposed adjustable discs 15. Secondly, additional novelty is predicated upon the frame members 20 having loose pivotal connection at 21 with the beam, said members 20 being disposed outwardly of the discs at their rear end portions in order to accommodate the plows 19.

The plow points are located within the vicinity of the rotary discs 15. The principal feature of novelty however is in the attachment of the appropriately shaped members 23 to the rear end portions of the frame members 20 wherein said members 23 have converging arms 24 which serve as expanding and contracting elements.

It will be noticed that the converging ends of these arms 24 are located on opposite sides of the central portion of the beam in spaced relation thereto so as to accommodate the substantially triangular wedge fastened to the ends of the arms 24 and the beam through the medium of simple bolt retained clips. The result is that the plows may be arranged either close to or farther from the disc 15 in accordance to the discretion of the user.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a plow construction of the class described, a longitudinal centrally disposed beam having handles at its rear end and draft means at its forward end, a pair of plow supporting beams having their forward ends loosely and pivotally connected to the central beam, a pair of duplicate plows secured to the rear end portions of said plow beams on opposite sides of the central beam, a pair of converging expanding and contracting arms rigidly attached to the rear end portions of said plow beams and having their adjacent converging forward ends located in spaced relation on opposite sides of the central beam, an expanding wedge interposed between the central beam and said arms, and means for fastening the wedge to the central beam and arms.

2. In a plow construction of the class described, a centrally disposed longitudinally extending beam having handles at its rear end and draft means at its forward end, a V-shaped frame rigidly attached to and underlying said central beam, a pair of opposed concavo-convex discs carried by said frame and located on opposite sides of said central beam, a pair of plow supporting beams having their rear end portions disposed in spaced parallelism on opposite sides of the central beam and having their forward edge portions converging toward the central beam and pivotally connected therewith, a pair of plows rigidly secured to the rear end portions of said plow beams, said plows being spaced outwardly of said discs, a pair of complemental members rigidly attached to said plow beams and including converging arm portions located on opposite sides of the central beam, a substantially triangular expanding wedge comprising a pair of complemental members located on opposite sides of the central beam and slidably engaged with the adjacent ends of said converging arms, and a clip for slidably and adjustably attaching the sections of said wedge to the central beam.

3. A plow including in combination, a central beam, plow beams on relatively opposite sides of the central beam and pivoted at their forward ends to the central beam, plows on the rear ends of the plow beams, an inclined substantially V-shaped frame suspended from said central beam, oppositely disposed plant protecting elements laterally mounted on said frame at the lower end thereof, and expansible and contractible means connecting the rear ends of the plow beams with said central beam and including a sectional wedge-shaped member slidably engaged with the central beam and having the sections thereof disposed at relatively opposite sides of the central beam.

In testimony whereof I affix my signature.

ROBERT IRBY ADAMS.